(12) United States Patent
Fehr et al.

(10) Patent No.: US 10,919,529 B2
(45) Date of Patent: Feb. 16, 2021

(54) METHOD FOR OPERATING A VEHICLE WITH A VEHICLE POWERTRAIN AND A VEHICLE BRAKE

(71) Applicant: ZF Friedrichshafen AG, Friedrichshafen (DE)

(72) Inventors: Philipp Fehr, Lindau (DE); Johannes Brockmann, Lindau (DE); Peter Schiele, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 274 days.

(21) Appl. No.: 16/061,438

(22) PCT Filed: Nov. 22, 2016

(86) PCT No.: PCT/EP2016/078408
§ 371 (c)(1),
(2) Date: Jun. 12, 2018

(87) PCT Pub. No.: WO2017/108302
PCT Pub. Date: Jun. 29, 2017

(65) Prior Publication Data
US 2020/0262431 A1    Aug. 20, 2020

(30) Foreign Application Priority Data
Dec. 22, 2015 (DE) .............. 102015226591

(51) Int. Cl.
*B60W 30/19* (2012.01)
*B60W 30/184* (2012.01)
(Continued)

(52) U.S. Cl.
CPC ...... *B60W 30/18072* (2013.01); *B60W 10/06* (2013.01); *B60W 10/08* (2013.01);
(Continued)

(58) Field of Classification Search
CPC .......... B60W 30/18072; B60W 30/19; B60W 10/06; B60W 10/08; B60W 10/10;
(Continued)

(56) References Cited

U.S. PATENT DOCUMENTS 8,398,522 B2    3/2013  Bauknecht et al.
2004/0038776 A1  2/2004  Kuhstrebe et al.
(Continued)

FOREIGN PATENT DOCUMENTS

DE           10216546 A1    10/2002
DE       102004058206 A1     7/2005
(Continued)

OTHER PUBLICATIONS

German Search Report DE102015226591.9 dated Aug. 17, 2016. (8 pages).

(Continued)

*Primary Examiner* — Tisha D Lewis
(74) *Attorney, Agent, or Firm* — Dority & Manning, P.A.

(57) ABSTRACT

A method for operating a vehicle having a vehicle drive train (1) and a vehicle brake (7) downshifting an automatic transmission (3) in a coasting condition, during which at least one friction-locking shift element is to be disengaged and one form-fit shift element is to be engaged. An output torque present at a driven end (4) is at least partially supported at a drive motor (2) at the point in time of a demand for the coasting downshift. The drive motor (2) is actuated before the implementation of the coasting downshift in order to reduce the portion of the output torque which is supportable at the drive motor (2), and a portion of the output torque is supported in the area of the vehicle brake (7) by an appropriate actuation of the vehicle brake (7).

13 Claims, 4 Drawing Sheets

(51) Int. Cl.
  *B60W 20/30* (2016.01)
  *B60W 30/18* (2012.01)
  *B60W 20/15* (2016.01)
  *B60W 10/06* (2006.01)
  *B60W 10/08* (2006.01)
  *B60W 10/11* (2012.01)
  *B60W 10/18* (2012.01)

(52) U.S. Cl.
  CPC ............ *B60W 10/11* (2013.01); *B60W 10/18* (2013.01); *B60W 20/15* (2016.01); *B60W 20/30* (2013.01); *B60W 30/19* (2013.01); *B60W 2510/0657* (2013.01); *B60W 2510/083* (2013.01)

(58) Field of Classification Search
  CPC .... B60W 10/11; B60W 10/18; B60W 10/184; B60W 20/15; B60W 20/30; B60W 2510/0657; B60W 2510/083
  See application file for complete search history.

(56) References Cited

U.S. PATENT DOCUMENTS

| | | |
|---|---|---|
| 2005/0124458 A1 | 6/2005 | Iwatsuki et al. |
| 2007/0270277 A1* | 11/2007 | Ortmann ............... B60W 20/00 477/5 |
| 2008/0208422 A1* | 8/2008 | Shibata ................... B60L 50/16 701/54 |
| 2012/0022752 A1 | 1/2012 | Arnold et al. |
| 2012/0053769 A1* | 3/2012 | Kumazaki ....... B60W 30/18072 701/22 |
| 2012/0135838 A1 | 5/2012 | Cuppers et al. |
| 2014/0100074 A1 | 4/2014 | Glugla |
| 2015/0038296 A1* | 2/2015 | Toyota .................. B60K 6/387 477/92 |
| 2015/0323067 A1 | 11/2015 | Ziemer et al. |
| 2018/0106367 A1* | 4/2018 | Mouri .................. B60W 10/06 |

FOREIGN PATENT DOCUMENTS

| | | |
|---|---|---|
| DE | 102005021714 A1 | 11/2006 |
| DE | 102006057666 A1 | 6/2008 |
| DE | 102008000429 A1 | 9/2009 |
| DE | 102009002206 A1 | 10/2010 |
| DE | 102009028305 A1 | 2/2011 |
| DE | 102010063026 A1 | 6/2012 |
| DE | 102014208873 A1 | 11/2015 |
| WO | WO 2006/119850 A1 | 11/2006 |

OTHER PUBLICATIONS

International Search Report (English Translation) PCT/EP2016/078408, dated Jan. 25, 2017. (3 pages).

* cited by examiner

METHOD FOR OPERATING A VEHICLE WITH A VEHICLE POWERTRAIN AND A VEHICLE BRAKE

FIELD OF THE INVENTION

The invention relates generally to a method for operating a vehicle including a vehicle drive train and a vehicle brake during a downshift in an automatic transmission in the coasting condition of the vehicle.

BACKGROUND

DE 10 2008 000 429 A1 describes a multi-stage transmission including nine forward gears and one reverse gear. The multi-stage transmission includes four friction-locking and two form-fit shift elements in order to be capable of engaging and disengaging multiple gear pairs of a gear set of the multi-stage transmission in order to implement the various gear ratios for forward travel and travel in reverse.

During defined coasting downshifts in the multi-stage transmission, one of the friction-locking shift elements is transferred into its disengaged operating condition and one of the form-fit shift elements is engaged in order to implement the demanded target ratio.

In this case, the form-fit shift element to be engaged is to be transferred into an operating condition required for the engagement, in which a differential speed between shift-element halves of the form-fit shift element to be engaged lies within a differential-speed window about the differential speed equal to zero. In addition, the form-fit shift element to be engaged is transferred into an at least approximately no-load operating condition.

In order to be capable of operating vehicles with the highest possible efficiency, vehicles are being designed, to an increasing extent, with so-called hybrid vehicle drive trains which include, in addition to internal combustion engines, electric machines or motors, in the area of which the kinetic energy of the vehicle can be converted into electrical energy during coasting.

If a demand for a coasting downshift, which was explained above in greater detail, arises during an activated recuperation operation of such an electric machine, however, the conventional approaches, during which a form-fit shift element to be engaged is synchronized by a positive engine override and an associated defined guidance of a rotational speed of a drive machine device designed with only an internal combustion engine, are only minimally suitable for implementing coasting downshifts with a desirably high level of ride comfort within defined operating times and with a vehicle behavior expected by a driver.

SUMMARY OF THE INVENTION

Example aspects of the present invention provide a method for operating a vehicle including a vehicle drive train having any configuration, in particular including a hybrid vehicle drive train, and including a vehicle brake, during a downshift in an automatic transmission in the coasting condition of the vehicle, by which coasting downshifts can be implemented within defined operating times with a high level of ride comfort and with expected handling characteristics.

In the method according to the invention for operating a vehicle including a vehicle drive train and including a vehicle brake during a downshift in an automatic transmission in the coasting condition of the vehicle, during which downshift at least one friction-locking shift element is to be disengaged and one form-fit shift element is to be engaged, an output torque present at a driven end is at least partially supported in the area of a drive machine device at the point in time of a demand for the coasting downshift.

According to the invention, the drive machine device is actuated before the implementation of the coasting downshift in order to reduce the portion of the output torque which can be supported in the area of the drive machine device, and a portion of the output torque is supported in the area of the vehicle brake by an appropriate actuation of the vehicle brake.

By the method according to the invention, a form-fit shift element to be engaged can be transferred, in a simple way, into an operating condition required for the engagement of the form-fit shift element independently of the configuration of the vehicle drive train, without substantially changing, during the coasting downshift, driving characteristics of a vehicle present at the point in time of the demand for the coasting downshift, during which the form-fit shift element is to be engaged, or without adversely affecting the handling characteristics to an extent not expected by a driver.

Due to the approach according to the invention, during which a portion of an output torque present in the area of the driven end, which is initially supported in the area of the drive machine device, is supported with little outlay by actuating the vehicle brake, the form-fit shift element to be engaged can be transferred into the operating condition required for the engagement by a suitable engine override, without substantially influencing handling characteristics of a vehicle.

If the friction-locking shift element is transferred, at the point in time at which the portion of the output torque which can be supported in the area of the drive machine device is essentially equal to zero, into an operating condition, in which the power transmission capacity of the friction-locking shift element is equal to zero and an increase in the actuation force brings about an immediate increase in the power transmission capacity of the friction-locking shift element, the form-fit shift element to be engaged during the coasting downshift is transferred into a no-load operating condition and is additionally transferred into the operating condition required for the engagement, with little outlay and within short operating times, by varying the torque available in the area of the drive machine device and by the additional spontaneous increase in the power transmission capacity of the friction-locking shift element.

The automatic transmission can be operated with high spontaneity during a coasting downshift when the torque made available by the drive machine device is varied, depending on the operating condition and in the disengaged operating condition of the friction-locking shift element, in order to synchronize the form-fit shift element during the coasting downshift.

If, upon detection of the engaged operating condition of the form-fit shift element, the torque available in the area of the drive machine device is guided in the direction of a demanded value and the actuation of the vehicle brake is withdrawn in a defined manner, a demanded operating condition of the vehicle is established within a desired scope, on the one hand and, in addition, a sustained load on the vehicle brake is avoided.

In one advantageous variant of the method according to the invention, the brake torque of the vehicle brake is predefined as a function of the torque made available by the drive machine device, in order to implement a defined acceleration of the vehicle. Therefore, the form-fit shift element to be engaged during the coasting downshift can be transferred, in a simple way, into the operating condition required for the engagement, without changing handling characteristics of a vehicle expected by a driver.

Ride comfort is improved by yet another advantageous variant of the method according to the invention in that the power transmission capacity of the friction-locking shift element is increased to a defined value in the at least nearly speed-synchronized operating condition of the still-disengaged, form-fit shift element and before an increase in the portion of the output torque which can be supported in the area of the drive machine device, wherein the friction-locking shift element is transferred into its completely disengaged operating condition, at the latest, starting at an increase in the portion of the output torque which can be supported in the area of the drive machine device.

If at least a portion of the output torque which can be supported in the area of the drive machine device is recuperated in the area of the drive machine device, then, in one variant of the method according to the invention, which can be carried out with little actuation effort, the recuperation operation of the drive machine device is terminated in the presence of the demand to implement the coasting downshift.

If the drive machine device includes at least one electric machine or motor and yet another drive machine which is preferably designed as an internal combustion engine, the electric machine is operated as a generator in the coasting condition of the vehicle, if necessary, in order to at least partially support the output torque, while at least one portion of the output torque can be supported in the area of the further drive machine.

In one advantageous variant of the method according to the invention, the portion of the output torque which can be supported in the area of the electric machine is reduced to zero in the presence of the demand to implement a coasting downshift in order to reduce the actuation effort during the coasting downshift and the output torque is at least partially supported only by the further drive machine, wherein the portion of the output torque previously supported by the electric machine is increasingly supported in the area of the vehicle brake by actuating the vehicle brake.

If at least the recuperation element of the electric machine is made available during the coasting downshift by actuating the vehicle brake, a demanded coasting downshift can always be implemented in the same way, independently of whether the vehicle drive train is in the recuperation mode or not at the point in time of the demand to implement the coasting downshift, without the need to provide various actuation routines therefor.

BRIEF DESCRIPTION OF THE DRAWINGS

Further advantages and advantageous embodiments of the subject matter of the invention can be found in the claims and the exemplary embodiments, the principle of which is described in the following with reference to the drawing; for the sake of clarity, the same reference characters are used for components having the same design and function.
Wherein:

DETAILED DESCRIPTION

Figure 1:
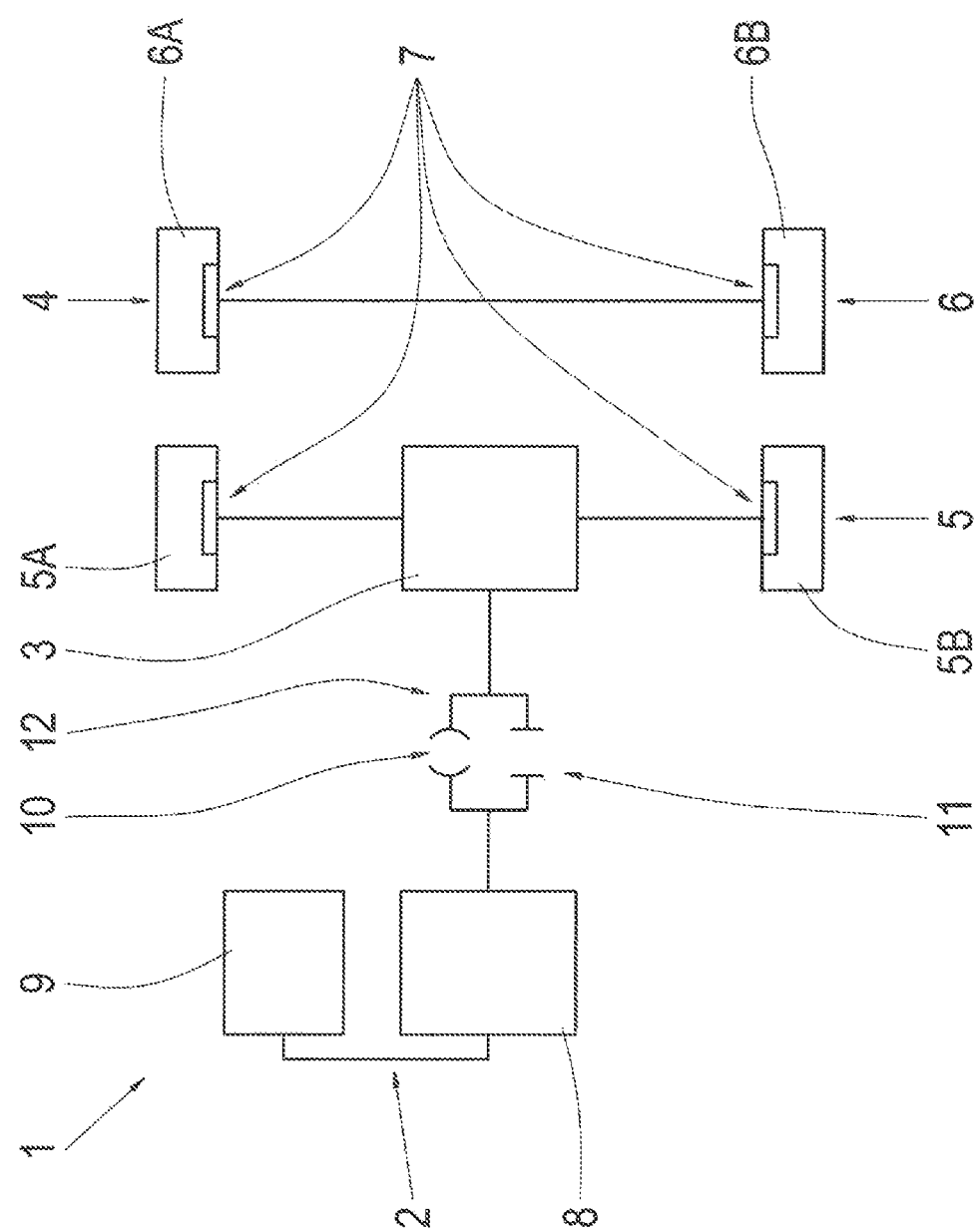
FIG. 1 shows a highly schematic representation of a vehicle drive train.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a highly schematic representation of a vehicle drive train 1 of a vehicle including a drive machine device 2, a transmission or an automatic transmission 3, and a driven end 4 which includes two drivable vehicle axles 5, 6 in this case. In the area of wheels 5A, 5B and 6A, 6B of the vehicle axles 5 and 6, a vehicle brake 7 known per se is provided, by which the vehicle can be decelerated when a brake pedal is actuated by a driver.

In the present case, the drive machine device 2 includes not only a drive machine 8 designed as an internal combustion engine, but also an electric motor or machine 9 which can be operated both as a motor and as a generator, and which is operatively connected to the drive machine 8, for example, via a belt, a chain, or the like, in order to be capable of starting the drive machine 8 to the desired extent and, in addition, to be capable of converting an output torque present in the area of the driven end 4 into electrical energy during coasting of the vehicle drive train 1, at least partially during a so-called recuperation operation of the drive machine device 2. In addition, a starting component 12, which is designed in the present case as a hydrodynamic torque converter 10 including an associated torque converter lockup clutch 11, is provided between the drive machine 8 and the transmission 3.

Figure 2:
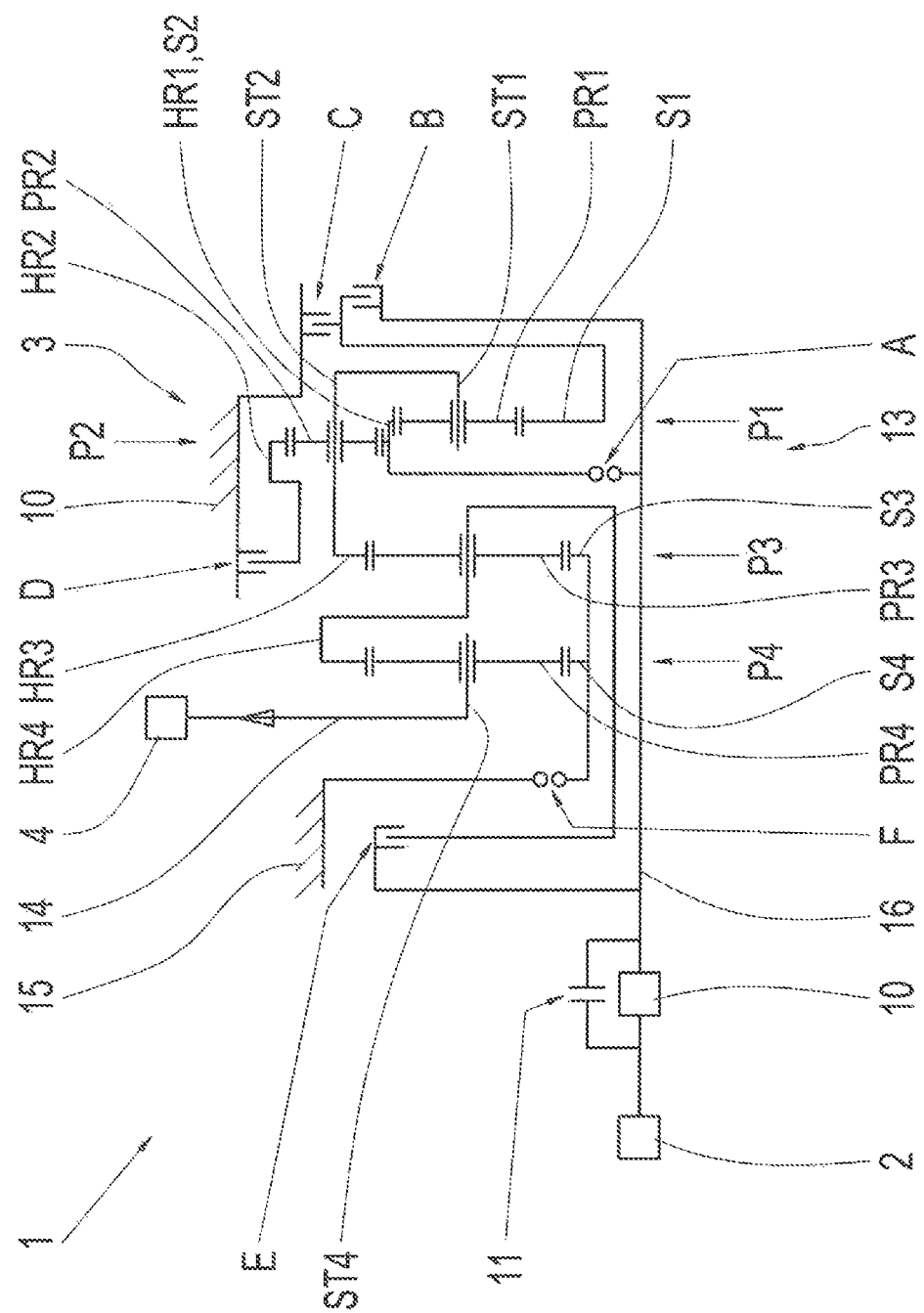
FIG. 2 shows a more detailed representation of the vehicle drive train according to FIG. 1, including an automatic transmission designed as a nine-speed transmission.

In FIG. 2, the vehicle drive train 1 according to FIG. 1 is represented in greater detail and includes an automatic transmission 3 designed as a 9-speed transmission including six shift elements A to F. The shift elements B, C, D and E are designed as friction-locking shift elements in the present case, while the shift elements A and F are form-fit shift elements. In this case, the shift elements C, D and F are so-called brakes, while the shift elements B, E and A are designed as clutches. In general, multiple gear pairs of a gear set 13 of the transmission 3 can be engaged and disengaged via the shift elements A and F in order to implement various ratios "1" to "9" for forward travel and one ratio "R" for travel in reverse, which ratios are listed in FIG. 3.

Figures 3, 4:
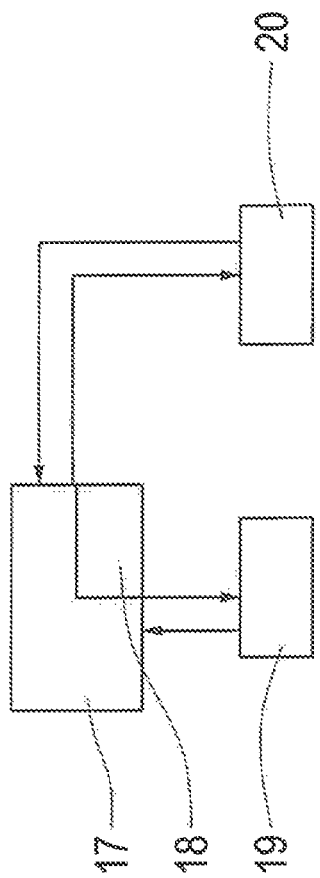
FIG. 3 shows a shift pattern of the automatic transmission according to FIG. 2.
FIG. 4 shows a control device of the vehicle drive train according to FIG. 1.

FIG. 3 shows a shift pattern of the transmission 3, wherein, in the shift pattern, the shift elements A to F are to be held in or transferred into the engaged operating condition in order to implement one of the gear ratios "1" to "R" which are marked by a dot, while the respective further shift elements A to F are to be simultaneously transferred into or held in their disengaged operating condition. In addition, the transmission value corresponding to the ratio "1" to "R" engaged in the transmission 3 is indicated in the second-to-last column of the shift pattern, while the ratio step present between two mutually adjacent ratios is indicated in the last column of the shift pattern. In this case, the first ratio "1" for forward travel has the ratio value 4.70, while the second ratio "2" for forward travel, which can be engaged in the transmission 3, has a ratio value of 2.84. Between the first ratio "1" for forward travel and the second ratio "2" for forward travel, the transmission 3 has a ratio step of 1.65. In all, the transmission 3 has an overall gear ratio of 9.81, depending on the design.

On the transmission input side, the transmission 3 is operatively connected to the drive machine 8 via the hydrodynamic torque converter 10. Associated with the hydrodynamic torque converter 10 in this case is the torque converter lockup clutch 11, the power transmission capacity of which is varied depending on the operating condition in a way known per se, in order to minimize losses in the area of the hydrodynamic torque converter 10. On the transmission output side, the transmission 3 is operatively connected to the driven end 4 via a transmission output shaft 14.

In this case, the transmission 3 includes four planetary gear sets P1 to P4, wherein the first and the second planetary gear sets P1 and P2, which are preferably in the form of negative or minus planetary gear sets, form a shiftable, input-side gear set, while the third planetary gear set and the fourth planetary gear set P3 and P4 form a so-called main gear set. In this case, a sun gear S3 of the third planetary gear set P3 is connected in a rotationally fixed manner to a sun gear S4 of the fourth planetary gear set P4. In the engaged operating condition of the form-fit shift element F, the two sun gears S3 and S4 are connected in a rotationally fixed manner to a housing-affixed component 15 and rotate freely in the disengaged operating condition of the form-fit shift element F. The sun gear S3 intermeshes with planetary gears PR3 which are rotatably arranged on a planet carrier ST3 of the third planetary gear set P3. Moreover, the planetary gears PR3 are engaged with a ring gear HR3 of the third planetary gear set P3. The sun gear S4 of the fourth planetary gear set P4 intermeshes, in turn, with planetary gears PR4 which are rotatably arranged on a planet carrier ST4 which is coupled in a rotationally fixed manner to the transmission output shaft 14. In addition, the planetary gears PR4 are engaged with a ring gear HR4 of the fourth planetary gear set P4 which, in turn, is connected in a rotationally fixed manner to the planet carrier ST3 of the third planetary gear set P3.

The planet carrier ST3 of the third planetary gear set P3 can be brought into an operative connection with a transmission input shaft 16 of the transmission 3 via the shift element E. The ring gear HR3 of the third planetary gear set P3 is connected in a rotationally fixed manner to a planet carrier ST2 of the second planetary gear set P2 which, in turn, is operatively connected in a rotationally fixed manner to a planet carrier ST1 of the first planetary gear set P1. Planetary gears PR2 rotatably mounted on the planet carrier ST2 intermesh with a ring gear HR2 as well as with a sun gear S2 of the second planetary gear set P2, wherein the ring gear HR2 can be connected in a rotationally fixed manner to the housing-affixed component 15 via the friction-locking shift element D. The sun gear S2 of the second planetary gear set P2, in turn, is connected in a rotationally fixed manner to a ring gear HR1 of the first planetary gear set P1 which intermeshes with planetary gears PR1 which, in turn, are engaged with a sun gear S1 of the first planetary gear set P1. The sun gear S1 can be connected in a rotationally fixed manner to the housing-affixed component 15 via the friction-locking shift element C and can be brought into an operative connection with the transmission input shaft 16 via the friction-locking shift element B. In addition, in the engaged operating condition of the shift element B, the sun gear S1 is connected in a rotationally fixed manner to the ring gear HR 1 of the first planetary gear set P1 via the form-fit shift element A.

Multiple control modules 17 to 20, which are shown in FIG. 4, are provided for the operation of the vehicle drive train 1 according to FIG. 1 and according to FIG. 2. In this case, the control module 17 is a so-called vehicle drive train control module which communicates and interacts with the control module 19, which is a transmission control module, as well as with the vehicle brake control module or the control module 20. In addition, the control module 18 is essentially provided for the operation of the electric machine 9 and also communicates with the control module 19 in the way described in greater detail in the following.

Figure 5:
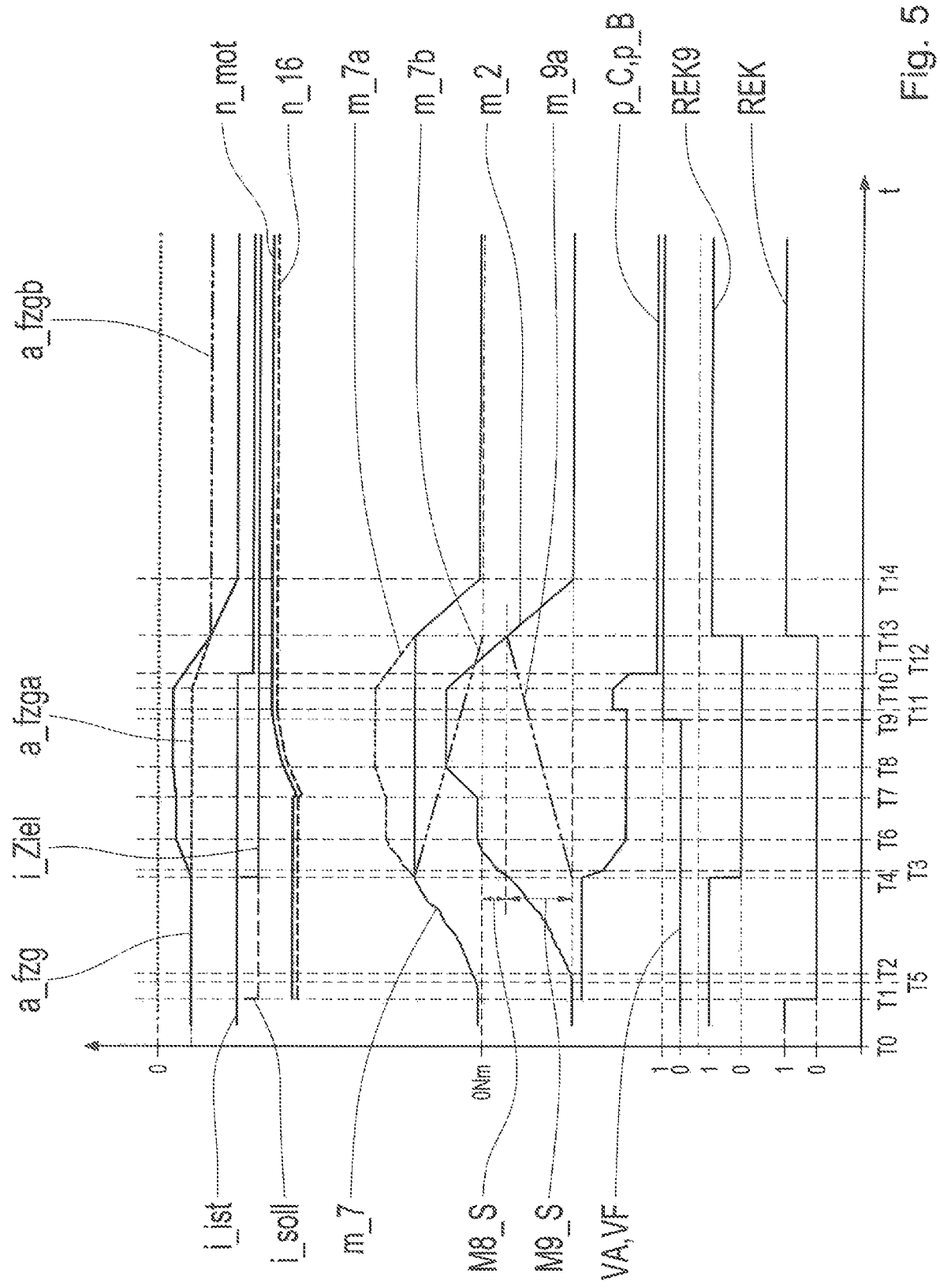
FIG. 5 shows multiple curves of various operating variables of a vehicle drive train including the automatic transmission according to FIG. 2, which set in over the time t during various operating condition progressions when the vehicle drive train is operated according to example aspects of the invention.

FIG. 5 shows curves of various operating variables of the vehicle drive train 1 according to FIG. 1 and FIG. 2, which set in over the time t during different operating condition progressions of the vehicle drive train 1. In the example shown, the vehicle drive train 1 is in the coasting condition at the point in time T0 and either the eighth ratio "8" or the fifth ratio "5" for forward travel is engaged in the transmission 3.

In this case, in principle, any transmission ratio step can be engaged, originating from which, in the case of a downshift, a form-fit shift element is engaged, either the shifting dog clutch A or the shifting dog clutch F in this case. This is the case, for example, when, originating from the eighth transmission ratio step "8" or a ninth transmission ratio step "9", a shift is carried out into a transmission ratio step below the eighth transmission ratio step "8" or when, originating from a sixth transmission ratio step "6" or a seventh transmission ratio step "7", a shift is carried out into a transmission ratio step below the fifth transmission ratio step "5".

During the coasting condition of the vehicle drive train 1, an output torque present in the area of the driven end 4 is supported in the area of the drive machine device 2 in such a way that a vehicle designed with the vehicle drive train 1 is decelerated in a constant manner according to the curve a_fzg of the vehicle acceleration. r For this purpose, the drive machine device 2 is held in the coasting condition, during which the drive machine 8 as well as the electric machine 9, which is then operated as a generator, provide a thrust torque. In this case, in the exemplary embodiment of the vehicle drive train 1 under consideration here, the drive machine 8 delivers a thrust torque M8_S which corresponds to approximately −30 Nm. The thrust torque M9_S generated in the area of the electric machine 8 is approximately −150 Nm and can be varied via the control module 18 depending on the operating condition. The recuperation operation of the electric machine 9 is carried out as a function of a demand related to driving strategy. During an activated recuperation operation of the electric machine 9, a curve REK has the value 1, while, in the presence of a demand to switch off the recuperation operation of the electric machine 9, the curve REK jumps from the value 1 to the value 0.

In addition, FIG. 5 shows a curve n_mot of the rotational speed of the drive machine 8 as well as a rotational speed n_16 of the transmission input shaft 16, which are essentially identical in this case. This results from the fact that, during the operating condition progressions forming the basis for the curves represented in FIG. 5, the torque converter lockup clutch 11 is completely engaged and the hydrodynamic torque converter 10 is bridged in order to avoid power losses.

At a point in time T1, a demand for a coasting downshift in the transmission 3 arises, originating from the eighth ratio "8" or originating from the fifth ratio "5", in the direction of the seventh ratio "7" or in the direction of the fourth ratio "4" for forward travel, respectively. For this purpose, according to the shift pattern according to FIG. 3, either the friction-locking shift element C is to be disengaged and the form-fit shift element A is to be engaged, or the friction-locking shift element B is to be disengaged and the form-fit shift element F is to be engaged.

It also applies in this case that, in principle, any transmission ratio step can be engaged, originating from which, in the case of a downshift, a form-fit shift element is engaged, either the shifting dog clutch A or the shifting dog clutch F in this case. This is the case, for example, when, originating from the eighth transmission ratio step "8" or a ninth transmission ratio step "9", a shift is carried out into a transmission ratio step below the eighth transmission ratio step "8" or when, originating from a sixth transmission ratio step "6" or a seventh transmission ratio step "7", a shift is carried out into a transmission ratio step below the fifth transmission ratio step "5".

In the presence of the demand for the coasting downshift in the transmission 3, the curve REK jumps from the value 1 to 0 and the control module 19 of the transmission 3 outputs a demand for the termination of the recuperation operation of the electric machine 9. In addition, at the point in time T1, a curve i_soll of the desired value to be engaged in the transmission 3 deviates from a curve i_ist of the actual ratio presently engaged in the transmission 3. At the point in time T1, an actuating pressure is applied to the particular friction-locking shift element C or B to be disengaged, in accordance with the curve p_C or p_B, respectively, of the actuating pressure of the friction-locking shift element C or B, respectively. The actuating pressure has the engagement pressure level p_zu, i.e., the appropriate friction-locking shift element C or B is engaged. When a friction-locking shift element is engaged, the two shift-element halves are connected to each other in a rotationally fixed manner or they rotate synchronously or in a non-slip manner at the same rotational speed.

In order to be capable of implementing the demanded coasting downshift with high spontaneity and to be capable of maintaining a present vehicle acceleration at least approximately to an unchanged extent, the control module 20 of the vehicle brake 7 receives from the control module 17 of the vehicle drive train 1 an appropriate demand for implementing a brake torque, in order to be capable of appropriately compensating for the thrust torque m_2 of the drive machine device 2, which is reduced in a ramped manner starting at a point in time T2 and which is reduced by the reduction of the thrust torque of the electric machine 9. For this purpose, a brake torque made available in the area of the vehicle brake 7 is increased in a ramped manner according to the curve m_7 represented in FIG. 5 starting at a point in time T3 lying before the point in time T2 up to a point in time T4, at which the thrust torque of the electric machine 9 is essentially equal to zero.

If it is detected, in the area of the control module 18 of the electric machine 9, that the thrust torque of the electric machine 9 is essentially equal to zero, the recuperation operation of the electric machine 9 is terminated and a curve REK 9 is set from the value 1 to 0. In addition, at the point in time T4, the actuating pressure p_C or p_B of the friction-locking shift element C or B, respectively, to be disengaged is reduced via a first pressure ramp up to a point in time T5 and the friction-locking shift element C or B to be disengaged is prepared for the disengagement to an extent which ensures a high level of ride comfort. At the point in time T4, the curve i_ziel of the target gear to be presently engaged in the transmission 3 jumps to the level of the curve i_soll of the demanded desired gear.

At the point in time T5, the actuating pressure p_C or p_B of the friction-locking shift element C or B, respectively, is further reduced up to a point in time T6 via a second pressure ramp which has a lesser gradient than the first pressure ramp. In this case, the friction-locking shift element C or B to be disengaged is transferred into an operating condition in which the power transmission capacity of the friction-locking shift element C or B to be disengaged is essentially equal to zero and an increase in the actuating pressure p_C or p_B of the friction-locking shift element C or B, respectively, to be disengaged or of the actuating force acting in the direction of engagement of the friction-locking shift element C or B to be disengaged brings about an immediate increase in the power transmission capacity of the friction-locking shift element C or B to be disengaged.

Moreover, at the point in time T4, the thrust torque m_2 of the drive machine device 2 is initially guided to the value zero by an appropriate actuation of the drive machine 8, which is why the deceleration of the vehicle implemented with the aid of the vehicle drive train 1 decreases according to the curve a_fzg. In this case, the thrust torque m_2 is essentially equal to zero at the point in time T6 and is left at this level up to a further point in time T7. At the point in time T7, the torque made available by the drive machine 8 is increased in a ramped manner up to a point in time T8 due to a demanded positive engine override, in order to transfer the form-fit shift element A or F to be engaged into an operating condition required for the engagement.

An operating condition required for the engagement of a form-fit shift element corresponds, inter alia, to an essentially no-load condition of a form-fit shift element, in which no significant torque is to be transferred via the form-fit shift element. In addition, a differential speed between the shift-element halves of a form-fit shift element to be brought into engagement with each other in a form-fit manner is to be guided to values within a differential-speed window about the value zero in order to be capable of reliably transferring a form-fit shift element from its disengaged operating condition into its engaged operating condition using low actuating forces and, simultaneously, with low component loads.

At the point in time T8, the positive torque made available by the drive machine 8 is held constant up to a point in time T10, at which the engaged operating condition of the form-fit shift element A or F to be engaged is reliably detected, wherein the form-fit shift element A or F to be engaged has already been engaged, in this case, at the point in time T9 and, therefore, the curve VA or VF, respectively, jumps from zero to the value 1 at the point in time T9.

Before the point in time T10 and after the point in time T9, the actuating pressure p_C or p_B of the friction-locking shift element C or B, respectively, to be disengaged is abruptly increased by the extent shown, in order to dampen reaction torques in the vehicle drive train 1 which may be adversely affecting the ride comfort and which result from the coasting downshift. Alternatively thereto, the increase in the actuating pressure p_C or the actuating pressure p_B can also take place in a ramped manner or according to any curve.

Due to the thrust torque m_2 of the drive machine device 2 having been reduced in a ramped manner at the point in time T10, or due to a reduced brake torque m_7a, the vehicle is decelerated to a greater extent, according to the curve a_fzg, at the point in time T10.

At the point in time T10, the actuating pressure p_C or p_B of the friction-locking shift element C or B, respectively, to be disengaged is reduced in a ramped manner to the actuating pressure level at the point in time T6. In addition, the actuating pressure p_C or p_B of the friction-locking shift element C or B, respectively, to be disengaged is abruptly guided, starting at a further point in time T12, to the disengagement pressure level p_auf, at which the friction-locking shift element C or B to be disengaged is in its completely disengaged operating condition. Alternatively thereto, the decrease in the actuating pressure p_C or the actuating pressure p_B can also take place in a ramped manner or according to any curve.

At the point in time T12, at which the demanded seventh ratio "7" or the fourth ratio "4" for forward travel has been engaged in the transmission 3 to the demanded extent, the curve i_ist of the actual gear jumps to the level of the curve i_soll and of the curve i_ziel. This applies, in principle, for any ratio which has been engaged by an engagement of a form-fit shift element, in this case the shifting dog clutch A or the shifting dog clutch F, during a downshift from a higher transmission ratio step. In addition, at the point in time T10, the torque m_2 of the drive machine device 2 is initially changed by guiding the torque made available by the drive machine 8 to the torque level at the point in time T4.

At the point in time T13, the drive machine device 2 reaches the thrust torque level at the point in time T4 by an appropriate actuation of the drive machine 8. This event, in turn, triggers a demand for the implementation of the recuperation operation of the electric machine 9 in this case, which is why the curve REK, in turn, jumps from zero to the value 1 and the electric machine 9 is operated as a generator, according to the curve REK9, at the point in time T13. The thrust torque of the electric machine 9 is appropriately predefined by the control module 18 until the thrust torque m_2 of the drive machine device 2 reaches, at the point in time T14, the thrust torque level present at the point in time T1.

In order to be capable of operating the vehicle with a vehicle acceleration to be expected by the driver, the brake torque m7 adjusted in the area of the vehicle brake 7 is appropriately reduced at the point in time T13 as a function of the curve m_2 of the drive machine device 2 and is reduced to zero up to the point in time T14. At the point in time T14, the vehicle designed with the vehicle drive train 1 is operated, in turn, with a constant deceleration.

Due to the above-described approach, the brake torque made available in the area of the vehicle brake 7 is held essentially constant between the points in time T4 and T13, while the vehicle deceleration initially decreases, according to the curve a_fzg, between the points in time T4 and T10, to the extent shown.

In order to be capable of operating the vehicle between the points in time T4 and T10 with a constant vehicle deceleration with little outlay, the brake torque made available by the vehicle brake 7 can be increased, for example, between the points in time T4 and T13 according to the dashed curve m_7a of the brake torque of the vehicle brake 7. The progression of the vehicle deceleration setting in as a result is shown in greater detail in FIG. 5 via the reference character a_fzga and by a dashed line.

In addition, FIG. 5 shows yet another curve m_7b of the brake torque of the vehicle brake 7 between the points in time T4 and T13, which sets in, at the point in time T4, during yet another possible operating condition progression of the vehicle designed with the vehicle drive train 1. During the further operating condition progression, a demand arises, at the point in time T4, to reduce the recuperation torque to be implemented in the area of the electric machine toward zero during the implementation of the demanded coasting downshift, the demand corresponding to the curve m9a represented between the points in time T4 and T13 in FIG. 5. Such a demand is generated, for example, when an electrical accumulator associated with the electric machine 9 is nearly completely charged or such an electrical accumulator has exceeded a permissible operating temperature. The two latter-mentioned operating conditions of the electrical accumulator associated with the electric machine 9 prevent a recuperation operation of the electric machine 9, which is why the recuperation operation of the electric machine 9 terminated at the point in time T4 is not reactivated to the above-described extent at the point in time T13 in this extreme case.

At the point in time T13, in order to avoid a change in the vehicle acceleration which is spurious and is not expected by a driver, the brake torque available in the area of the vehicle brake 7 is reduced to zero in a ramped manner, according to the curve m_7b, between the points in time T4 and T13, originating from the level present at the point in time T4.

The resultant change in the vehicle acceleration is not shown in greater detail in FIG. 5 between the points in time T4 and T13. At the point in time T13, however, a constant vehicle deceleration sets in according to the curve a_fzgb, which is less than the vehicle deceleration setting in during the above-described approach at the point in time T13.

By the approach according to the invention, the situation is avoided, in a simple way, in which a positive torque made available by the drive machine device 2 in order to synchronize the form-fit shift element A or F causes a reduction in the present vehicle deceleration which is noticeable by a driver, due to a thrust torque which is additionally introduced into the vehicle drive train 1 during a recuperation operation of the electric machine 9.

In order to hold an acceleration level of a vehicle designed with the vehicle drive train 1 at least approximately at the level present at the point in time of the demand for the coasting downshift despite the positive torque applied by the drive machine 8 for the synchronization of the form-fit shift element A or F to be engaged, a compensation of the torque, which otherwise changes the vehicle deceleration and is made available in the area of the drive machine device 2, is carried out via the vehicle brake 7. In this case, the actuation of the vehicle brake 7 takes place by a predefined torque or brake pressure. The demand for the brake torque or brake pressure to be applied takes place in the area of the control module 17 and/or the control module 18 of the electric machine 9.

By the approach according to the invention, it is possible, in a simple way, to prevent a change in acceleration of the vehicle, which previously resulted from the positive engine override, via the compensation braking in the area of the vehicle brake 7 during the implementation of a demanded coasting downshift. For this purpose, an appropriate brake torque or an appropriate brake pressure for the vehicle brake 7 is generated by the control module 17 implemented, for example, in the area of the motor control or by the control module 18 by reading in the positive engine override demanded by the control module 19 of the transmission 3 and by a present gear train ratio.

If the demand for the implementation of the coasting downshift arises, in this case, at a point in time T1 which lies, by a defined time value or offset, in a simple way, before the point in time at which a coasting downshift is usually demanded, originating from an operating condition of the vehicle drive train 1, in which no recuperation is carried out in the area of the electric machine 9, the coasting downshift can be implemented in the transmission 3, independently of whether the shift request takes place during a recuperation operation in the area of the electric machine 9 or if there is no recuperation in the area of the electric machine 9. For this purpose, the defined time value is to be selected in such a way that the recuperation torque or thrust torque made available in the area of the electric machine 9 can be guided to zero within the defined time value up to the actual start of the coasting downshift. Subsequent thereto, the coasting downshift can be implemented independently of a previously activated recuperation operation of the electric machine 9 with the same pressure control in the area of the particular friction-locking shift element C or B to be disengaged and with the same torque guidance in the area of the drive machine 8.

Therefore, existing vehicle drive trains which were previously designed without an electric machine can be expanded with little outlay and can be actuated or operated to the same extent across large operating ranges. This means, gear shifts in the transmission 3 are always carried out at the same point in time, independently of a previously activated recuperation operation and depending on the operating condition and, therefore, expected handling characteristics of a vehicle designed with the vehicle drive train 1 can be made available to a driver.

Modifications and variations can be made to the embodiments illustrated or described herein without departing from the scope and spirit of the invention as set forth in the appended claims.

REFERENCE CHARACTERS 1 vehicle
2 drive machine device
3 transmission, automatic transmission
4 driven end
5 vehicle axle
5A, 5B wheel
6 vehicle axle
6A, 6B wheel
7 vehicle brake
8 drive machine
9 electric machine
10 hydrodynamic torque converter
11 torque converter lockup clutch
12 starting component
13 gear set
14 transmission output shaft
15 housing-affixed component
16 transmission input shaft
17 to 20 control module
"1" to "9" transmission ratio for forward driving
"R" transmission ratio for travel in reverse
A to F shift element
a_fzg vehicle acceleration
HR1 to HR4 ring gear
i_ist transmission ratio
i_soll desired value
i_ziel target ratio
m_2 torque of the drive machine device
m_7 brake torque
m_7a brake torque
m_7b brake torque
M8_S thrust torque of the drive machine
M9_S thrust torque of the electric machine
m_9a demand for recuperation torque
p_auf disengagement pressure level
p_B actuating pressure of the shift element B
p_C actuating pressure of the shift element C
p_zu engagement pressure level
P1 to P4 planetary gear set
PR1 to PR4 planetary gear
REK curve
REK9 curve
S1 to S4 sun gear
ST1 to ST4 planet carrier
t time
T0 to T14 discrete point in time
VA, VF curve

The invention claimed is:

1. A method for operating a vehicle having a vehicle drive train (1) and a vehicle brake (7), comprising:
    operating the vehicle in a coasting condition;
    initiating a downshift in an automatic transmission (3) during the coasting condition, at least one friction-locking shift element (C; B) is to be disengaged and one form-fit shift element (A; F) is to be engaged during the downshift; and
    supporting at least a portion of an output torque present at a driven end (4) of the automatic transmission (3) with a drive motor (2) at the point in time of a demand for the downshift and before beginning to disengage the at least one friction-locking shift element (C; B) during the downshift,
    wherein the drive motor (2) is actuated before implementation of the downshift in order to reduce the portion of the output torque which is supportable with the drive motor (2), and a portion of the output torque is supported with the vehicle brake (7) via actuation of the vehicle brake (7).

2. The method of claim 1, further comprising reducing a power transmission capacity of the at least one friction-locking shift element (C; B) in the presence of the demand for the downshift and when the output torque falls below a threshold value (M8_S).

3. The method of claim 1, further comprising, at a point in time (T6) at which the portion of the output torque which is supportable with the drive motor (2) is essentially equal to zero, transferring the at least one friction-locking shift element (C; B) into an operating condition in which a power transmission capacity of the at least one friction-locking shift element (C; B) is equal to zero and an increase in an actuating force brings about an immediate increase in the power transmission capacity of the at least one friction-locking shift element (C; B).

4. The method of claim 1, further comprising varying a torque (m_2) made available by the drive motor (2) when the at least one friction-locking shift element (C; B) is in a disengaged operating condition in order to synchronize the form-fit shift element (A; F) during the downshift.

5. The method of claim 1, upon detection of an engaged operating condition of the form-fit shift element (A; F), further comprising:
    guiding the torque available at the drive motor (2) towards a demanded value; and
    withdrawing the actuation of the vehicle brake (7) in a defined manner.

6. The method of claim 1, further comprising adjusting a brake torque of the vehicle brake (7) as a function of the torque (m_2) available at the drive motor (2) in order to implement a defined acceleration (a_fzg) of the vehicle.

7. The method of claim 1, further comprising:
increasing a power transmission capacity of the friction-locking shift element (C; B) to a defined value when the still-disengaged, form-fit shift element (A; F) is at least nearly speed-synchronized and before an increase in the portion of the output torque which is supportable with the drive motor (2); and
transferring the friction-locking shift element (C; B) into a disengaged operating condition no later than a start of the increase in the portion of the output torque which is supportable with the drive motor (2).

8. The method of claim 1, further comprising:
recuperating at least a portion of the output torque which is supportable at the drive motor (2) with the drive motor (2); and
terminating the recuperation with the drive motor (2) in the presence of the demand for the downshift.

9. The method of claim 1, wherein:
the vehicle drive train (1) further comprises at least one electric motor (9) and an additional drive motor (8) which is an internal combustion engine;
the electric motor (9) operable as a generator in the coasting condition in order to support at least one portion of the output torque; and
at least another portion of the output torque is supportable at the additional drive motor (8).

10. The method of claim 9, further comprising:
reducing the portion of the output torque which is supported at the electric motor (9) to zero in the presence of the demand for the downshift until the output torque is at least partially supported only by the additional drive motor (8); and
actuating the vehicle brake to support the portion of the output torque previously supported by the electric motor (9) with the vehicle brake (7).

11. The method of claim 9, further comprising actuating the vehicle brake (7) to make available at least a recuperation torque of the electric motor (9) during the downshift.

12. A method for operating a vehicle having a vehicle drive train (1) and a vehicle brake (7), comprising:
operating the vehicle in a coasting condition;
initiating a downshift in an automatic transmission (3) during the coasting condition, at least one friction-locking shift element (C; B) is to be disengaged and one form-fit shift element (A; F) is to be engaged during the downshift;
supporting at least a portion of an output torque present at a driven end (4) of the automatic transmission (3) with a drive motor (2) at the point in time of a demand for the downshift; and
at a point in time (T6) at which the portion of the output torque which is supportable with the drive motor (2) is essentially equal to zero, transferring the at least one friction-locking shift element (C; B) into an operating condition in which a power transmission capacity of the at least one friction-locking shift element (C; B) is equal to zero and an increase in an actuating force brings about an immediate increase in the power transmission capacity of the at least one friction-locking shift element (C; B),
wherein the drive motor (2) is actuated before implementation of the downshift in order to reduce the portion of the output torque which is supportable with the drive motor (2), and a portion of the output torque is supported with the vehicle brake (7) via actuation of the vehicle brake (7).

13. A method for operating a vehicle having a vehicle drive train (1) and a vehicle brake (7), comprising:
operating the vehicle in a coasting condition;
during the coasting condition, recuperating at least a portion of an output torque which is supportable at a drive motor (2) with the drive motor (2);
terminating the recuperation with the drive motor (2) in the presence of a demand for a downshift;
initiating the downshift in an automatic transmission (3) during the coasting condition, at least one friction-locking shift element (C; B) is to be disengaged and one form-fit shift element (A; F) is to be engaged during the downshift; and
supporting at least a portion of the output torque present at a driven end (4) of the automatic transmission (3) with the drive motor (2) at the point in time of the demand for the downshift,
wherein the drive motor (2) is actuated before implementation of the downshift in order to reduce the portion of the output torque which is supportable with the drive motor (2), and a portion of the output torque is supported with the vehicle brake (7) via actuation of the vehicle brake (7).

* * * * *